O. M. LEICH.
TELEGRAPH SYSTEM.
APPLICATION FILED FEB. 9, 1917.
1,269,539.
Patented June 11, 1918.
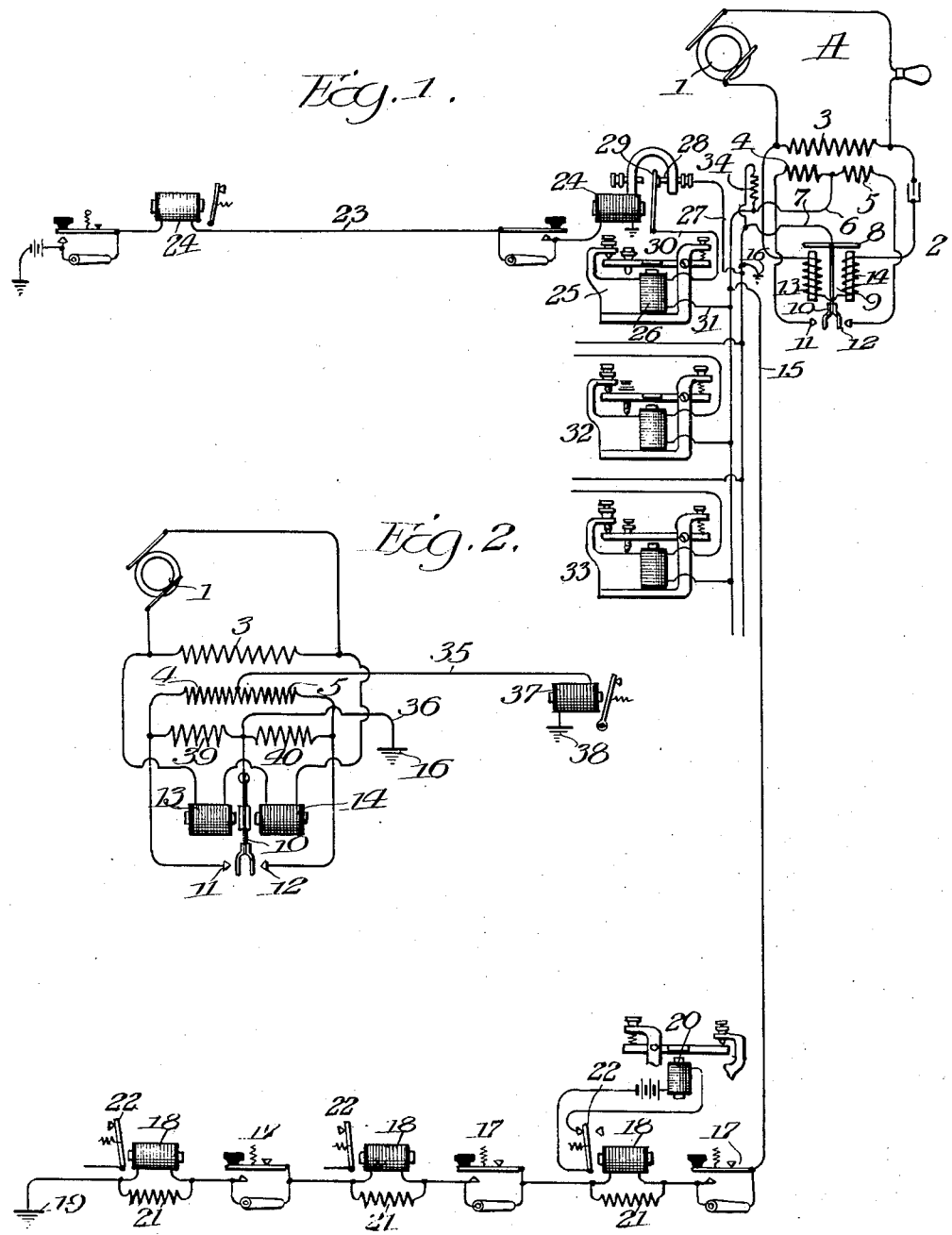
Inventor
Oscar M. Leich
by [signature] atty.

UNITED STATES PATENT OFFICE.

OSCAR M. LEICH, OF GENOA, ILLINOIS, ASSIGNOR TO LEICH ELECTRIC COMPANY, OF GENOA, ILLINOIS.

TELEGRAPH SYSTEM.

1,269,539.  Specification of Letters Patent.  Patented June 11, 1918.

Application filed February 9, 1917. Serial No. 147,517.

*To all whom it may concern:*

Be it known that I, OSCAR M. LEICH, a citizen of the United States, residing at Genoa, in the county of Dekalb and State of Illinois, have invented a certain new and useful Improvement in Telegraph Systems, of which the following is a full, clear, concise, and exact description, reference being had to the accompanying drawings, forming a part of this specification.

My invention relates to telegraph systems, and has for its object the provision of an improved system of this character in which it is possible to operate telegraph relays or sounders through the agency of a rectified alternating current or current of uni-directional character obtained from such a source. As well understood, the telegraph sounders and telegraph relays are operated from battery sources as a general rule, and it is a considerable expense to maintain the batteries in satisfactory condition. In most of the telegraph service stations, at least in most of those stations where the batteries are kept for operating telegraph lines, alternating current generally of sixty cycles is available. My invention contemplates the use of means for changing the alternating current into uni-directional current so that it may be used for telegraphic purposes, means being provided to adapt the telegraph relays and sounders for proper operation in connection with such rectified or other uni-directional current. These means take the form of a suitable provision of preventing the chattering of the relay or sounder armatures which they would otherwise do when used in connection with a current such as above outlined.

I will describe my invention more in detail by referring to the accompanying drawing illustrating the same, in which—

Figure 1 diagrammatically shows one form of carrying out my invention, and

Fig. 2 shows a modified form thereof.

In Fig. 1, I show a central station A to which alternating current may be led from a suitable source 1. A vibratory rectifier 2 is shown consisting of the primary winding 3 and the secondary windings 4 and 5, the intermediate connection between these windings 4 and 5 serving as one terminal for the uni-directional source of current, this terminal being exemplified by the conductor 6. The other terminal of the uni-directional source as exemplified by the conductor 7 finds its origin in the armature 8 of the vibratory device 9, which vibratory device through the agency of its polarized armature 8 actuates the switching device 10 coöperating with the contacts 11, 12. The contacts 11 and 12 are respectively connected to the free terminals of the windings 4 and 5, and the coils 13 and 14 of the vibratory device 9 are serially included across the source of alternating current so that the armature 8, together with the switch arm 10 vibrates in harmony with the frequency of the alternating current, thus to rectify the alternating current and supply the conductors 6 and 7 with uni-directional current. I have shown a telegraph line 15 connected to the conductor 6, the conductor 7 being grounded as shown at 16. This telegraph line extends through the various telegraph keys 17, 17, and the various relays 18 throughout the various stations of the system, the conductor being serially grounded as shown at 19.

At one of the stations I have indicated the connections and instrumentalities whereby the relay 18 controls the sounder 20. The relays, if not properly controlled, would chatter in response to the pulsating uni-directional current fed by the conductors 6 and 7. To obviate this chattering I connect a resistance 21 across the terminals of the relays and this resistance permits temporary discharges so as to maintain the magnetism in the relay cores to thereby maintain the armatures 22 in a positively attracted condition except when the current is broken through the agency of the keys 17. The resistance of course is large so as not to deprive the relays of any measurable portion of their current. For instance, if the relays 18 were wound to fifty ohms then the resistances 21 might conveniently be wound to three hundred ohms in order to cause proper actuation of the system. I likewise show a second telegraph line 23 which enters the station A and which operates the relay 24 thereat. This relay 24 controls a circuit including a sounder 25, the coil 26 of this sounder receiving its current directly from the conductors 6 and 7, which circuit may be traced from conductor 7, through conductor 27, relay contact 28, relay armature 29, conductor 30, coil 26, conductor 31, into conductor 6. Additional sounders, such as the sounders 32 and 33 may similarly receive their current from the conductors 6 and 7, these sounders being controlled by other relays not shown in a manner similar to the control of the relay 25.

I find that under circumstances such as this but one resistance 34 is needed for a plurality of sounders or relays for that matter, thus cheapening the construction materially. This is due to the practically negligible resistance between the points of connection of the various sounders to the conductors 6 and 7. The same would hold true if the line resistances of the line wire 15 were substantially negligible, in which event one resistance might answer for all of the relays 18. When the line resistance is too large separate resistances or means must be employed to prevent the chattering of the relays.

It is of course obvious that the resistances 21 or 34 may be replaced by re-active devices so long of course as the re-active effect is not too large to prevent the holding current from passing therethrough.

In Fig. 2, I show an alternating source of power 1 as again supplying current to the primary winding 3 of the transformer having the secondary windings 4, 5. The actuating coils 13 and 14 of the rectifier are again connected across the primary mains, as shown in Fig. 1. The armature 10 is again actuated to make contact with the contact points 11 and 12 connected respectively with the terminals of the secondary windings 4, 5. A line conductor 35 extends from the central point of the windings 4, 5, as shown, and a conductor 36 forming the other side of the rectifier circuit is grounded as shown at 16, this conductor being connected to the armature 10. A telegraph relay 37 is shown in the line circuit, it being understood that this telegraph relay 37 is typical merely of a telegraph line, the other apparatus on said line it not being thought material to illustrate herein. The other terminal of the relay 37 is shown as grounded at 38. Resistances 39 and 40 have one of their terminals respectively connected to the terminals of the secondaries 4 and 5, their other terminals being connected together and being connected to the conductor 36 which extends to the vibrator structure 10.

The structure of Fig. 2 thus provides a rectified current for the line wires 35, 36, the same as in Fig. 1. The means for permitting a discharge from the coil of the relay 37 includes one or the other of the resistances 39 and 40, or both, and one or the other of the windings 4, 5, or both. Thus when the armature 10 is in its intermediate position, as shown, at which time the line wires 35 and 36 are not being fed with current from the secondary windings, a discharge is likely to occur from the relay 37 and this discharge can travel over the following path: beginning with the ground 38, through the relay 37, line wire 35, winding 5, resistance 40, conductor 36, ground 16, and over the ground to the other ground connection 38.

It will thus be seen that means are provided for taking this discharge without the inclusion of an auxiliary resistance at the relay. The resistances 39 and 40 are of course then enough so as not to detract to an appreciable extent from the current which is being supplied to the line wires 35 and 36 by the rectifier.

From what has been thus described the nature of my invention will be readily clear to those skilled in the art.

Having however thus described one form which my invention may take, what I claim as new and desire to secure by Letters Patent is:

1. A system of the character described comprising a telegraph line, telegraph relays connected to said line, a source of pulsating uni-directional current for said line, and a resistance bridging said relays to maintain magnetization thereof irrespective of the pulsations of said current thereby to prevent chattering of the relay armatures.

2. A system of the character described comprising a telegraph line, electromagnetic telegraph instruments connected to said line, a source of pulsating uni-directional current for said line, and a resistance bridging said instruments to maintain magnetization thereof irrespective of the pulsations of said current thereby to prevent chattering of the instrument armatures.

3. A system of the character described comprising a telegraph line, telegraph relays connected to said line, a source of pulsating uni-directional current for said line, and a circuit bridging said relays to maintain magnetization thereof irrespective of the pulsations of said current thereby to prevent chattering of the relay armatures.

4. A system of the character described comprising a telegraph line, electromagnetic telegraph instruments connected to said line, a source of pulsating uni-directional current for said line, and a circuit bridging said instruments to maintain magnetization thereof irrespective of the pulsations of said current thereby to prevent chattering of the instrument armatures.

5. A system of the character described comprising a telegraph line, electromagnetic telegraph instruments connected to said line, a source of pulsating uni-directional current for said line, and a by path about said instruments to maintain magnetization thereof irrespective of the pulsations of said current thereby to prevent chattering of the instrument armatures.

In witness whereof, I hereunto subscribe my name this 7th day of February, A. D. 1917.

OSCAR M. LEICH.

Witnesses:
HAZEL A. JONES,
MAX W. ZABEL.